United States Patent
Marzaro et al.

(10) Patent No.: US 7,490,024 B2
(45) Date of Patent: Feb. 10, 2009

(54) INTEGRATED SYSTEM FOR THE RUNNING AND CONTROL OF MACHINES AND EQUIPMENT, IN PARTICULAR FOR THE TREATMENT OF FOODSTUFF

(75) Inventors: Luca Marzaro, Curtarolo (IT); Stefano Zambon, Campo San Martino (IT)

(73) Assignee: SIRMAN S.p.A., Padua (IT)

( * ) Notice: Subject to any disclaimer, the term of this patent is extended or adjusted under 35 U.S.C. 154(b) by 133 days.

(21) Appl. No.: 11/443,423

(22) Filed: May 30, 2006

(65) Prior Publication Data

US 2006/0271206 A1 Nov. 30, 2006

(30) Foreign Application Priority Data

May 31, 2005 (IT) .......................... VI2005A0163

(51) Int. Cl.
G06F 11/00 (2006.01)
G06F 15/00 (2006.01)
G06F 15/16 (2006.01)
G06F 15/173 (2006.01)
G05B 11/01 (2006.01)
G08B 21/00 (2006.01)

(52) U.S. Cl. .......................... 702/188; 700/17; 700/19; 709/206; 709/224; 714/57; 340/540

(58) Field of Classification Search .................. 700/17, 700/19, 20, 65, 83; 702/188; 99/282; 709/203, 709/206, 223, 224; 340/538, 540; 705/27; 714/48, 57; 455/115.4

See application file for complete search history.

(56) References Cited

U.S. PATENT DOCUMENTS

| | | | |
|---|---|---|---|
| 4,856,047 A * | 8/1989 | Saunders | 340/7.55 |
| 5,450,478 A * | 9/1995 | Christy et al. | 379/106.01 |
| 6,246,325 B1 * | 6/2001 | Chittipeddi | 340/540 |
| 6,745,103 B1 * | 6/2004 | McKillop et al. | 700/230 |
| 6,853,291 B1 | 2/2005 | Aisa | |
| 6,957,111 B2 * | 10/2005 | Zhu et al. | 700/90 |
| 7,032,818 B2 * | 4/2006 | Thomas et al. | 235/381 |
| 7,034,663 B2 * | 4/2006 | Mansfield et al. | 340/538 |
| 7,104,184 B2 * | 9/2006 | Biderman et al. | 99/282 |

(Continued)

FOREIGN PATENT DOCUMENTS

EP 1598714 A 11/2005

OTHER PUBLICATIONS

European Search Report, Aug. 14, 2006.

*Primary Examiner*—Crystal J Barnes Bullock
(74) *Attorney, Agent, or Firm*—James V. Costigan; Hedman & Costigan, P.C.

(57) ABSTRACT

An integrated system for the running and control of machines and equipment (10), in particular for the treatment of foodstuff, comprising an electronic circuit card (11), installed in the machine (10) and equipped with a relative microprocessor (12), suitable for controlling the machine (10), and a modem device on a network line (13), suitable for transmitting a series of data and/or information onto the machine (10), such as periods of use, diagnostics, maintenance expiry dates etc.; data and/or information are conveyed through the electric feeding line of the machines (10), to a central unit or collector (14) which, in turn, sends the data received to a central collecting and processing unit, via GSM (17, 18) and/or e-mail (19), through Internet.

9 Claims, 1 Drawing Sheet

U.S. PATENT DOCUMENTS

| | | | |
|---|---|---|---|
| 7,149,773 B2 * | 12/2006 | Haller et al. | 709/203 |
| 7,249,172 B2 * | 7/2007 | Ollive et al. | 709/223 |
| 7,281,040 B1 * | 10/2007 | Ly | 709/224 |
| 7,302,469 B2 * | 11/2007 | Motoyama et al. | 709/206 |
| 7,387,239 B2 * | 6/2008 | Thomas et al. | 235/381 |
| 7,418,413 B1 * | 8/2008 | Benson | 705/27 |
| 2002/0194319 A1 * | 12/2002 | Ritche | 709/223 |
| 2003/0118353 A1 * | 6/2003 | Baller et al. | 399/8 |
| 2006/0017324 A1 * | 1/2006 | Pace et al. | 307/3 |
| 2006/0278093 A1 * | 12/2006 | Biderman et al. | 99/282 |
| 2008/0132185 A1 * | 6/2008 | Elliott et al. | 455/115.4 |
| 2008/0204246 A1 * | 8/2008 | Kates | 340/572.1 |

* cited by examiner

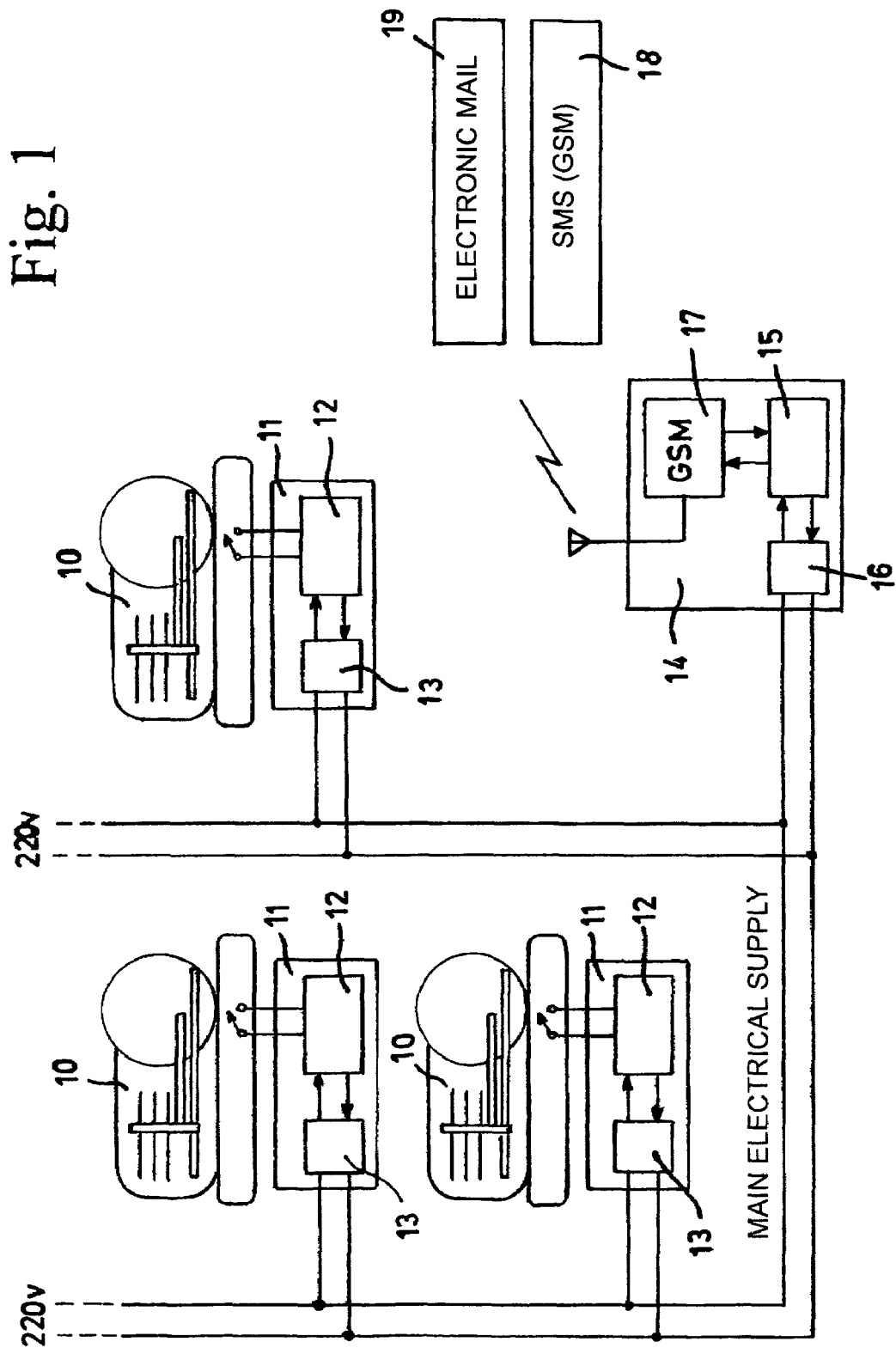

INTEGRATED SYSTEM FOR THE RUNNING AND CONTROL OF MACHINES AND EQUIPMENT, IN PARTICULAR FOR THE TREATMENT OF FOODSTUFF

BACKGROUND OF THE INVENTION

The present invention relates to a control and management system of equipment and/or machines in general, to be integrated to each machine, which allows the remote acquisition of specific information on the functioning of the machine relating to the periods of use, diagnostics, maintenance expiry dates, etc.

The invention relates, in particular, to a control and running system of machines and equipment for restaurants, machines for the treatment of foodstuff, such as, for example, slicing machines, blenders, cutters, mixers, bagging machines, coffee grinders, potato peeling machines, citrus fruit squeezers, mincing machines, etc.

The idea arose from the observation that national large-scale retail trades are increasingly concentrating their interest on their own activities, delegating the management of the equipment to third parties.

This in fact facilitates the management of rented machines and the whole distribution system and, above all, there are fixed overall operating costs, which can be estimated beforehand.

A general objective of the present invention is to provide an integrated system for the running and control of machines and equipment, in particular for the treatment of foodstuff, which allows the remote acquisition of a series of data and/or information such as periods of use, diagnostics, anomalies, maintenance expiry dates, etc. relating to the functioning of each of the machines distributed by the management, for renting, in the various sales points.

Another objective of the present invention is to provide an integrated system for the running and control of machines and equipment, in particular for the treatment of foodstuff, which allows data and information to be collected, relating to the machines and equipment directly in the sales point and also allows said information and/or functions to be transmitted to the management, to one or more resellers and/or to the whole distribution network.

A further objective of the present invention is to provide an integrated system for the running and control of machines and equipment, in particular for the treatment of foodstuff, which is particularly effective, comfortable and safe, which also simplifies the entire management of the equipment and allows fixed costs for the management, which can be estimated in advance.

BRIEF SUMMARY OF THE INVENTION

These and other objectives are achieved by an integrated system for the running and control of machines and equipment, in particular for the treatment of foodstuff, according to the enclosed claim 1; further technical characteristics of the system are disclosed in the dependent claims.

BRIEF DESCRIPTION OF SEVERAL VIEWS OF THE DRAWING

FIG. 1 is a block diagram of an integrated system according to the present invention.

DETAILED DESCRIPTION OF THE INVENTION

Other functional characteristics of the present invention and its advantages with respect to the known art will appear more evident from an examination of the following description, referring to an illustrative and preferred, but not limitative, embodiment and from the enclosed drawing (FIG. 1) which shows a block scheme of an integrated system for the running and control of machines and equipment, in particular for the treatment of foodstuff, according to the present invention.

It should be noted that, even if FIG. 1 enclosed relates, illustratively and specifically, to a system for the running and control of slicing machines, the system according to the invention, as mentioned before, can also be used for any machine and/or equipment for catering and/or suitable for the treatment of foodstuff, such as, for example, mixers, blenders, cutters, bagging machines, coffee grinders, potato peelers, citrus fruit squeezers, mincing machines, etc.

With reference to the mentioned FIG. 1, the control and communication system of the slicing machines 10, situated in the sales point, for rental, comprises an electronic card 11, present on each machine 10, equipped with a control microprocessor 12 and a modem device inserted in the power line 13, suitable for the remote transmission of data and/or information relating to the machine 10, through the power supply line of the machines 10.

The data and/or information are sent to a central unit or collector 14, also equipped with a control microprocessor 15 and a modem device 16 in the power line, which, in turn, sends the data, via GSM, by means of the block 17, to one or more mobile phones, by sending SMS messages (block 18), and/or through the Internet network, by sending e-mail messages to an e-mail address (block 19), so that said data and/or information are sent to a central unit where they can be suitably processed.

In practice, the functions relating to the periods of use of the machine 10, diagnostics, possible anomalies, maintenance expiry dates, etc., which are collected at the sales point through the conveyed wave technology, i.e. through the electric supply line of the machines 10, are transmitted via SMS to an operating central unit 14 (which can include the managing operator, and/or the reseller and/or the distribution network, etc.).

Each electronic card 11, positioned on the machine, comprises the on-line modem 13, a filtered and stabilized "switching" feeder, and a microprocessor 12, suitable for the command and control of a series of inputs which, in preferred embodiments, refer to the ON/OFF signal of the machines 10, to a control output of the stoppage of the machines 10, to a temperature signal in order to verify the stress of the motor in the case of short-distance alarms for consequent stoppages of the machines 10, and a counting signal of the slices produced; in this respect, naturally, the exemplificative case speaks of slices, as the machine 10 is a slicing machine, but, as already mentioned, it is possible to select other significant parameters of the functioning of the machine, according to variations of the type of the same.

The collecting device 14 is prepared for the control and running of a pre-established number of machines and consists of a "switching" feeder, filtered and stabilized, of a bi-directional on-line modem 16 for the control of the machines 10 and the transmission of data, and a microprocessor system 15, suitable for the overall control of the system, data processing and supervision on the transmission of the same.

The collecting device 14 can also avail of a GPRS system, equipped with connectors, cable and dual band aerial, for the transmission of e-mail messages to an e-mail address through SMS, when, for the telephone server selected, it is not possible to directly transmit e-mail messages to an e-mail address through SMS.

The collector 14 can be equipped with a plastic container, which can be fixed to the wall, for the containment of the whole system.

Finally, the system can process the information received, envisaging suitable interventions, by means of an operating software; the system, for example, can charge the client, through the operating software, for the time of use of each machine 10 (by counting, for example, the number of slices effected by a slicing machine), anticipate repair interventions, even before the user has noticed the malfunctioning or breakage of the machine, create a register for periodical maintenance, etc.

This programming can be effected through the serial inlet of a PC, using a suitable program, or through SMS messages.

Furthermore, the programming of the operating parameters comprises the insertion and planning of a series of data in the system, such as data relating to SMS telephone numbers, in order to send regular or alarm messages to one or more mobile phones, data relating to e-mail addresses,. in order to send regular or alarm messages through e-mail, data relating to the e-mail server, data relating to the e-mail prefix (phrase at the beginning of the message indicating the type of message), data relating to the name of the user (name which is transmitted at the end of regular messages and alarm messages), data relating to transmission frequency, in order to program the period which separates one transmission from another, data relating to the temperature threshold, in order to activate/deactivate the alarm relating to an excessive temperature of the machine motor, data relating to the threshold of the slices produced (in the case of slicing machines), in order to establish the number of slices which must be exceeded for the machine to send an alarm, data relating to the sharpening threshold (for electric cutting machines), in order to establish the number of sharpening operations which must be exceeded for an alarm to be sent and, finally, data relating to the number of machines connected, in order to memorize the data sent by these machines so that they can be consulted and/or modified; in this respect, the above data which are sent by the machines normally include the total minutes of use of the machine, the total number of start-ups of the machine, the total number of sharpening operations and, in the case of the slicing machines, the total number of slices produced.

The characteristics of the integrated running and control system of machines and equipment, in particular for the treatment of foodstuff, object of the present invention, as also the relative advantages, appear clear from the above description.

Finally, it is evident that numerous variations can be applied to the integrated running and control system in question, all included within the novelty principles contained in the inventive idea, and it is also clear that, in the practical embodiment of the invention, the materials, forms and dimensions of the details illustrated can vary according to requirements, and can be substituted by other technically equivalent alternatives.

The invention claimed is:

1. An integrated system for the running and control of machines and/or equipment (10) for the treatment of foodstuff, characterized in that it comprises an electronic circuit card (11), installed in each machine (10) and equipped with a relative microprocessor (12), suitable for controlling the machine (10), and a modem device on a network line (13), suitable for the remote transmission of a series of data and/or information onto the relative machine (10), through the electric supply line of the machines (10), to at least one central unit or collector (14) which, in turn, sends the data received to at least one central collecting and/or data processing unit, via GSM (17, 18) and/or e-mail (19), through the Internet wherein said data and/or information are sent, in the form of periodical and/or alarm messages to a series of SMS telephone numbers and/or to one or more e-mail addresses, said data and/or information comprising data relating to at least one temperature threshold, in order to activate/deactivate the alarm relating to an excessive temperature of the machine (10) motor, data relating to at least one threshold value of parameters relating to the functioning of the machine (10) and data relating to at least the number of machines (10) connected to the system, their periods of use and the starting operations effected.

2. The integrated running and control system according to claim 1, characterized in that said machines and/or equipment (10) include slicing machines and/or any other machine and/or equipment for catering and/or suitable for the treatment of foodstuff, mixers, blenders, cutters, bagging machines, coffee grinders, potato peeling machines, citrus fruit squeezers or mincing machines.

3. The integrated running and control system according to claim 1, characterized in that said machines and/or equipment (10) are present in various sales points for rental.

4. The integrated running and control system according to claim 1, characterized in that said collector (14) is equipped with at least one microprocessor (15) and at least one on-line bi-directional modem device (16) which, in turn, transmits the data, via GSM (17), to one or more mobile telephones, by sending SMS messages (18) and/or via Internet network by sending e-mail messages to an e-mail address (19).

5. The integrated running and control system according to claim 1, characterized in that said data and/or information relating to each machine (10), relate to the periods of use of the machine 10, diagnostics, possible anomalies of the machine (10) or maintenance expiry dates.

6. The integrated running and control system according to claim 1, characterized in that said central unit for collection and/or processing comprises one or more servers and/or one or more resellers and/or distribution chains.

7. The integrated running and control system according to claim 1, characterized in that said microprocessor (12), assembled on said printed circuit card (11), which is positioned on the machine, is programmed for the running and control of a series of inlets, which relate to the ON/OFF signal of the machines (10), to at least one outlet for the stoppage control of the machines (10), to at least one temperature signal, suitable for verifying the stress of the machine (10) motor, in the case of short-distance alarms for consequent stoppages, and to at least one counting signal of one or more pre-established parameters, relating to the functioning of the machine (10).

8. The integrated running and control system according to claim 1, characterized in that said collector (14) includes at least one GPRS system for the direct transmission of e-mail messages to an e-mail address through SMS.

9. The integrated running and control system according to claim 1, characterized in that it uses at least one suitable operating software, which is programmable and suitable for programming interventions and/or controls on said machines (10).

* * * * *